3,377,483
AUTOMATIC CONTROL FOR TRAINS AND OTHER VEHICLES
John Joyce, 179 Thacher St., Milton, Mass. 02187
Filed Oct. 23, 1965, Ser. No. 503,822
2 Claims. (Cl. 246—63)

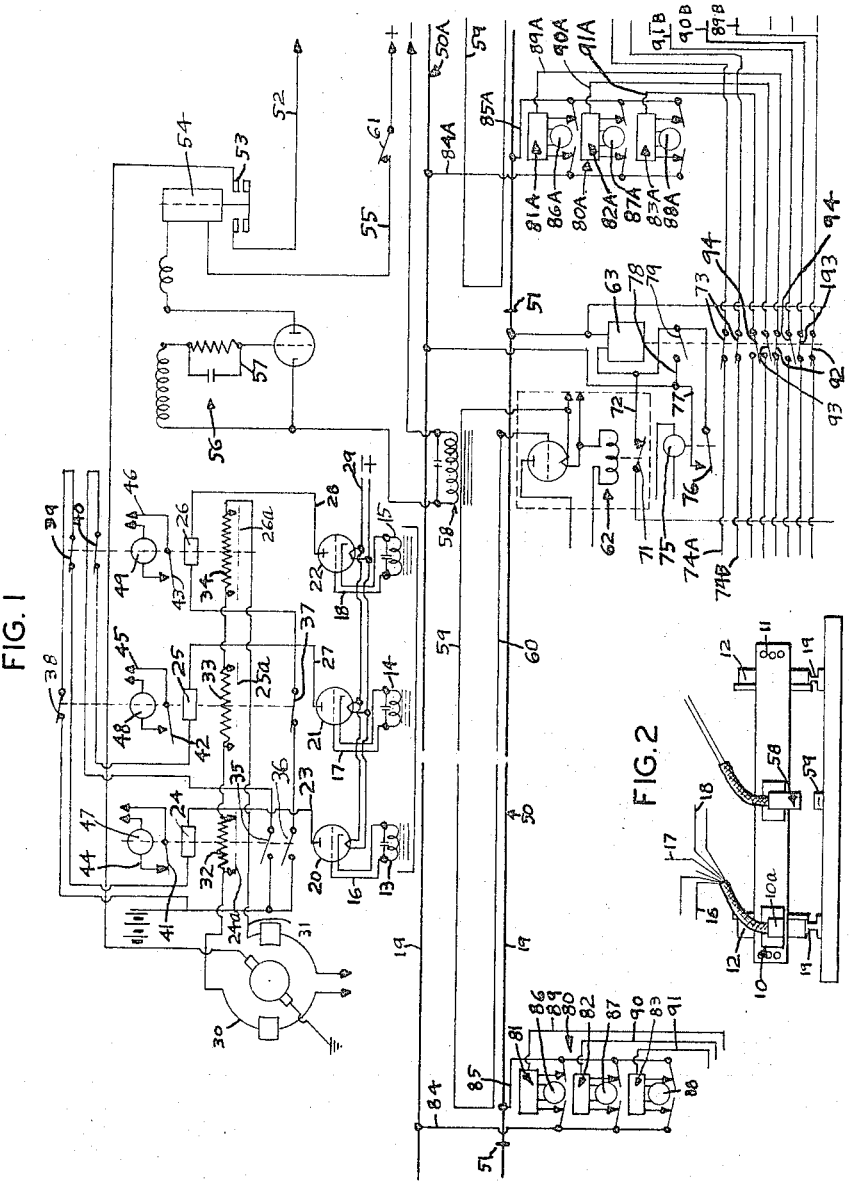

ABSTRACT OF THE DISCLOSURE

Control for trains and other vehicles, the vehicle having a circuit essential to its operation and having a switch, a shunting circuit and speed control circuit connected thereto with a relay in control of the switch to insure that the vehicle cannot be moved without delivering a shunting circuit.

---

The present invention relates to automatic controls for trains and other vehicles.

While the invention is adapted for use in controlling the speed of other vehicles, it is herein discussed with particular reference to trains where the problem of ensuring safe operation has resulted in the use of various types of safety equipment, including automatic stops. Such stops take the control of the train away from the engineer if the stop mechanism is out of order or if the train passes a red light. This basis of control sometimes defeats its own purposes by putting the train and its occupants in danger. In addition, automatic train stops are costly to install and to maintain.

Among the general objectives of the present invention is that of providing a speed control that compels the operator to observe speed rules, that of eliminating rear end collisions attributable to the failure of section relays to shunt due, for example, to foreign matter on the rails in the case of a track guided or track supported vehicle, causing poor contact, and that of not taking control entirely away from the operator.

These objects are attained by providing the trail or other vehicle with a plurality of speed controls, each including a pick-up circuit resonant at a predetermined frequency different from that at which the others resonate. Each speed control, when its pick-up circuit is energized, establishes a predetermined maximum speed different from that established by any other speed control.

Each track section circuit is insulated from the others and carries the current for the coils of the pick-up circuits of the vehicles in it and includes a wayside relay for use in controlling the pick-up circuit or circuits for track sections for the control of following vehicles. Associated with each other section circuit is a co-extensive shunting circuit also provided with a wayside relay operable to shunt the section relay out of the section circuit. Each shunting circuit is controlled by the vehicle, preferably with current being delivered thereto inductively and utilizing the cables and combinatitons disclosed in my co-pending application, Ser. No. 48,784, filed Aug. 10, 1960.

Current to each track section circuit to energize vehicle pick-up circuits is delivered by an appropriate one of a plurality of parallel, wayside oscillators to generate the frequency for an appropriate one of the pick-up circuits. Each oscillator is part of an appropriate one of a plurality of wayside control circuits with which each section is provided and each oscillator control circuit includes switches as part of the wayside equipment of one or more preceding section circuits and operable by the relays thereof.

Each track section relay remains energized once it has been energized until it is shunted out of its section circuit by a vehicle within the section having that particular circuit. A shunted section relay is restored to its circuit by means of an associated checking relay and in a checking circuit provided with one or more switches, each part of the wayside equipment of a preceding section circuit and operable by the section relay thereof.

The function of each track section relay is to operate, in predetermined relation, checking and oscillating circuit switches associated therewith to affect traffic in one or more following track section circuits.

In the accompanying drawings, there are shown illustrative embodiments of the invention, particularly adapted for train control, from which these and other of its objectives, novel features, and advantages will be readily apparent.

In the drawings:

FIGURE 1 is a schematic view illustrating the vehicle speed controls and the magnet of the vehicle for energizing the shunting circuits, oscillators for delivering speed control current to the vehicle, a shunting track section circuit, and oscillator control and checking relay circuits, and FIGURE 2 is a fragmentary view of a vehicle truck showing parts of the speed control and shunting circuits.

For convenience, reference is first made to the vehicle whose speed is to be controlled and in FIGURE 2, there is shown a unit 10 carried by the truck frame 11 to be located ahead of, towards the viewer, the first set of wheels 12 of the locomotive. The unit 10 includes, by way of example, and as shown in FIGURE 1, tuned coils 13, 14 and 15, in a holder 10$^a$, for the pick-up battery circuits 16, 17 and 18, respectively. Each of the coil circuits 13, 14 and 15 is adapted to resonate when current of a predetermined frequency is present in the track rails 19 of the track section in which the locomotive is travelling. By way of example, the coil circuits 13, 14 and 15 resonate at 23, 49, and 77 cycles, respectively.

The locomotive pick-up circuits 16, 17 and 18 include the grids of control tubes 20, 21 and 22, respectively. The plate circuit 23 of the control tube 20 includes a relay 24 and similar relays 25 and 26 are included in the plate circuits 27 and 28, respectively, of the tubes 21 and 22. In each of the tubes 20, 21 and 22, the grids of the control tubes 20, 21, and 22 are heated by the heaters in the heater circuit 29.

While the invention is adapted to affect the control of train speeds regardless of the type of propulsion, in the embodiment shown in the drawings, speed control is achieved by increasing or decreasing resistances in the output of the generator 30 which powers the propulsion motor in whose field circuit 31 there are indicated resistances 32, 33 and 34 adapted to be shunted by the operation of a respective one of shunting switches 24,$^a$ 25$^a$, and 26$^a$ of the relays 24, 25 or 26, respectively. For example, when the relay 24 is energized in response to, say, a 23 cycle current in the track 19, it closes the shunting switch 24$^a$ and thus shunts out the resistance 32 to allow a maximum speed of 25 miles per hour. When the relay 25 is energized, for example, by 49 cycle current in the track 19, the resistance 33 is shunted enabling maximum speeds of 50 miles per hour to be attained. Similarly, when the relay 26 is energized as by 77 cycle current in the track, speeds of say, 75 miles per hour, maximum, are attainable since the resistance 34 is now shunted out of the circuit 31.

It is preferred option that the total effect of the resistances 32, 33 and 34 be such that, with no current in the track to operate any of the pick-up circuits, the output of the generator 30 is only such that the propulsion motor enables the train to be moved, as in an emergency, at a predetermined slow speed, say, up to ten miles per hour.

As it is desirable that only one pick-up circuit of a train be operated at any one time, it is provided that when the relay 24 is energized, it opens normally closed switches 35 and 36 in the circuits 27 and 28, respectively, and the relay 25, when energized, opens the normally closed switch 37 in the circuit 28 and normally closed switch 38 in the circuit 23. When the relay 26 is energized, it opens normally closed switches 39 and 40 in the circuits 23 and 27, respectively. By these or equivalent means, it is impossible for a pick-up circuit to be closed that establishes a higher speed than the attendant operating circumstances warrant.

Each of the relays 24, 25 and 26, when energized is also operative to close a respective one of the normally open switches 41, 42 and 43 in circuits 44, 45 and 46, respectively, located in the cab, not shown. The circuits 44, 45, and 46 includes signals such as, for example, different colored lights 47, 48 and 49, respectively.

In order for suitable pick-up currents to be delivered to the track 19 in any generally indicated section such as the section 50 or 50A, which sections are insulated from each other at 51 for operation of a train, the preceding train must initiate control under certain circumstances as are fully set forth in the above referred-to co-pending application.

A manually opened and closed lead 52 from the generator 30 to the propulsion motor, not shown, includes a relay switch 53 closed when the relay 54 is energized. The relay 54 is in a circuit 55 including a generally indicated oscillator 56 having a tuned or tank circuit 57 to generate a selected inductive frequency in the inductive shunting electro-magnetic coil 58 mounted on the end of the truck frame 11 and located in FIGURE 1 over the inductive shunting cable 59 between the track rails 19 of the section 50 and constituting a part of the shunting circuit 60. The relay 54 is energized whenever the switch 61 controlling the circuit 55 is closed.

The shunting cable 59 extends the length of the track section 50 and the shunting circuit 60 is also provided with a shunting relay 62 as part of the wayside equipment adjacent the proximate ends of the track sections 50 and 50A. The rails of the section 50 constitute a track or section circuit including a section relay 63 which remains energized as long as the shunting cable 59 and the locomotive coil 58 are inductively coupled. Because the coupling is inductive, intervening foreign matter will not and cannot defeat the operation of the shunting circuit control of the section relay 63.

From the foregoing, it will be apparent that whatever the frequency (in cycles) of the current delivered to the track section 50, its section or track relay 63 is energized unless there is a train in that section, in which case, the relay 63 is shunted out by the relay 62 which closes the normally open switch 71 in the shunting lead 72.

I claim:

1. In a control system for a vehicle for use with a series of section circuits each provided with an inductive shunting circuit to affect the current of a following section circuit, a circuit to the propulsion unit of the vehicle and essential to the operation thereof and including a switch, and a control circuit closed to the shunting circuit of the section said vehicle is in, said control circuit including a relay operable to close said propulsion unit circuit switch.

2. In a control system for a vehicle for use with a series of section circuits, each provided with an inductive shunting circuit to affect a following section circuit, a circuit to the propulsion unit of the vehicle and essential to the operation thereof and including a switch, and a control circuit including a relay to operate said switch, a coil to provide an inductive couple with the shunting circuit of the circuit the vehicle is in, and an oscillator.

References Cited

UNITED STATES PATENTS

| | | | |
|---|---|---|---|
| 2,000,166 | 4/1935 | Espenschied | 246—63 |
| 2,105,930 | 1/1938 | Reichard | 246—63 |
| 2,134,952 | 11/1938 | Powell | 246—63 |
| 2,197,417 | 4/1940 | Place | 246—34 |
| 2,257,473 | 9/1941 | McKeige et al. | 246—157 |
| 2,554,056 | 5/1951 | Peter et al. | 246—63 |
| 3,045,112 | 7/1962 | Hailes | 246—63 |

ARTHUR L. LA POINT, *Primary Examiner.*

S. B. GREEN, S. T. KRAWCZEWICZ,
*Assistant Examiners.*